Patented Oct. 13, 1942

2,298,974

UNITED STATES PATENT OFFICE 2,298,974

GLASS-TO-METAL SEAL

George Robert Shaw, Verona, N. J., assignor to Radio Corporation of America, a corporation of Delaware No Drawing. Application November 30, 1939, Serial No. 306,972

1 Claim. (Cl. 49—81)

My invention relates to glass-to-metal seals, particularly to seals between glass and metal in an electron discharge device.

The object of my invention is a strong bond between glass and metal where the glass and metal have widely different thermal coefficients of expansion.

Metal and glass having different coefficients of expansion are difficult to seal together because the metal cracks the glass during cooling from the sealing temperature. Metal bodies, such as support wires and lead-in conductors, embedded in the glass press of a radio tube often have a much higher thermal coefficient of expansion than the glass in which the wires are embedded. While the glass is molten or in the softened state it easily flows into contact with the metal and, where the metal is slightly oxidized on its surface, an adhesive bond is established between the glass and the metal. Then as the parts cool the glass solidifies and the metal tends to pull away from the glass but because of the metal-to-glass bond the metal stresses the glass, and usually cracks it.

According to my invention the metal is treated so that during firing and sealing a less adhesive bond is established between the glass and the metal. This I propose to do by preventing extended areas of contact between the glass and the metal. According to the preferred embodiment of my invention the metal is impregnated or coated with a gas producing substance which when heated generates gas and fills the glass with bubbles at the surface of the metal. The glass then joins only to discrete places along the metal and the bubbles function as a cushion between the glass and the metal.

An effective low-strain bond may be made between metal and glass, having different expansion characteristics such as nickel or nickel-plated iron support wires in the press of a radio tube stem, by firing the wires in a hydrocarbon gas for a sufficient time to impregnate the surface of the wire with the gas. Probably some carbon and carbides of the metal are formed. When the metal is heated in contact with the glass copious quantities of gas appear at the surface of the metal and blow bubbles in the glass in contact with the wire. These gas bubbles prevent wetting of the metal by the glass over the entire surface of the metal and apparently diminish the strains in the glass to prevent cracking.

Alternatively, the gas producing impurity may be applied to the surface of the wire in solid form. Carbon, either amorphous or crystalline may be coated on or impregnated into the surface of the metal, and when heated in contact with glass produces gas bubbles in the glass. Graphite or lamp black is conveniently applied in an inherent smooth coating to the surface when mixed with a volatile binder and sprayed on the metal parts. The metal parts may, if desired, be carbonized in the usual way by covering with a thin pasty coating of graphitic carbon and heated to drive off a binder and adhere the carbon to the metal. Carbonized nickel or nickel plated iron wire or strips, when heated in contact with glass, produces a bond with the glass characterized by small bubbles in the glass at the surface of the metal. The bond is mechanically strong and the glass is free of visible cracks.

My invention is particularly useful in sealing solid nickel wires or nickel plated iron wires into commercial soft glass as lead glass. It has been found that pure metals, such as electrolytic nickel will crack the glass, apparently because the metal is gas-free and permits too firm a seal with the glass. When electrolytic nickel is carbonized or fired in a hydrocarbon gas at a temperature of about 800° C. for 10 to 15 minutes it can readily be sealed into a commercial lead borate glass without cracks. The bubbles are probably produced by adsorbed gas released from the carbon as well as by gas resulting from reaction between carbon and glass.

According to my invention a strong bond may be made between glass and metal having widely different thermal coefficients of expansion. My improved method of sealing glass to metal is inexpensive and easy to use.

I claim:

The method of joining a metal body having a nickel surface to a glass body, the metal and glass having widely different coefficients of thermal expansion, which comprises firing the metal in a hydrocarbon gas and then heating the metal and glass bodies in contact to sealing temperature.

GEORGE ROBERT SHAW.